US008347052B2

(12) United States Patent
Fienblit et al.

(10) Patent No.: US 8,347,052 B2
(45) Date of Patent: *Jan. 1, 2013

(54) INITIALIZING OF A MEMORY AREA

(75) Inventors: Shachar Fienblit, Ein Ayala (IL); Eyal Gordon, Haifa (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,274

(22) Filed: Jan. 17, 2012

(65) Prior Publication Data

US 2012/0117347 A1    May 10, 2012

Related U.S. Application Data

(63) Continuation of application No. 12/182,045, filed on Jul. 29, 2008, now Pat. No. 8,135,932.

(51) Int. Cl.
*G06F 12/00* (2006.01)
(52) U.S. Cl. ............... 711/162; 711/166; 711/E12.001; 711/E12.103
(58) Field of Classification Search ............... 711/162, 711/166, E12.001, E12.103
See application file for complete search history.

(56) References Cited

U.S. PATENT DOCUMENTS

| 6,665,743 | B2 | 12/2003 | Benhase et al. | |
|---|---|---|---|---|
| 6,697,881 | B2 | 2/2004 | Cochran | |
| 6,976,124 | B2 | 12/2005 | Morita et al. | |
| 8,135,932 | B2 | 3/2012 | Fienblit et al. | |
| 2002/0161818 | A1* | 10/2002 | Watakabe et al. | ............. 709/107 |
| 2003/0131163 | A1 | 7/2003 | Ishi et al. | |
| 2003/0233596 | A1 | 12/2003 | Corbin et al. | |
| 2004/0221102 | A1 | 11/2004 | Watanabe | |
| 2008/0126678 | A1 | 5/2008 | Mizushima | |

OTHER PUBLICATIONS

Non-Final Office Action from U.S. Appl. No. 12/182,045 dated Mar. 17, 2011.
Notice of Allowance and Fee(s) due from U.S. Appl. No. 12/182,045 dated Aug. 19, 2011.
Notice of Allowance and Fee(s) due from U.S. Appl. No. 12/182,045 dated Nov. 1, 2011.

* cited by examiner

*Primary Examiner* — Yong Choe
(74) *Attorney, Agent, or Firm* — Zilka-Kotab, PC

(57) ABSTRACT

A method for initializing a memory area, the method includes: receiving a request to access a first memory sub area of a first memory area that comprises multiple memory sub areas; and initializing the first memory sub area if a first memory area initialization indicator differs from a first memory sub area initialization request indicator; wherein the first memory area initialization request indicator is a multiple bit variable indicative of a time of a last request to initialize the first memory area and the first memory sub area initialization indicator is a multiple bit variable indicative of a time of a request to initialize the first memory area that resulted in a last initialization of the first memory sub area.

20 Claims, 7 Drawing Sheets

INITIALIZING OF A MEMORY AREA

RELATED APPLICATIONS

This application is a continuation of U.S. patent application Ser. No. 12/182,045, filed Jul. 29, 2008, and which is herein incorporated by reference.

FIELD OF THE INVENTION

The present invention relates to methods and computer program products for initializing a memory area.

BACKGROUND OF THE INVENTION

Storage devices should be initialized before being accessed. The initialization process of a large memory area of a storage device is long and can prevent access to the memory area before the initialization process is completed.

There is a growing need to allow access to a memory sub area while another memory sub area is being initialized.

A well known data recovery method involves generating snapshot copies of a content of memory areas. The copy process is long and usually involves copying one memory sub area after the other.

Data corruption can occur when a request to initialize a memory area is received during the copying process or even if an initialization of an entire memory area was not completed before the copying process starts.

There is a growing need to provide methods, systems and computer program products that enable efficient initialization of memory areas at a snapshot copy supporting environment.

SUMMARY

A method for initializing a memory area, the method comprises receiving a request to access a first memory sub area of a first memory area that comprises multiple memory sub areas, and initializing the first memory sub area if a first memory area initialization indicator differs from a first memory sub area initialization request indicator, wherein the first memory area initialization request indicator is a multiple bit variable indicative of a time of a last request to initialize the first memory area and the first memory sub area initialization indicator is a multiple bit variable indicative of a time of a request to initialize the first memory area that resulted in a last initialization of the first memory sub area.

BRIEF DESCRIPTION OF THE DRAWINGS

The present invention will be understood and appreciated more fully from the following detailed description taken in conjunction with the drawings in which.

DETAILED DESCRIPTION

Multiple processes are provided. These multiple processes can be executed at least partially in parallel to each other. A first process includes receiving requests to initialize a memory area, updating a memory area initialization request indicator and waiting to the next request to initialize the memory area. A second process involves gradually initializing memory sub areas of that memory area in response to requests to access these memory sub areas and in response to requests to initialize the memory area. A third process can involve receiving a request to generate a copy of the content of the memory area as it was at a certain point in time and generating such a copy, conveniently at a second storage unit that differs from a first storage unit that includes the memory area. It is noted that either one of the first and second can be executed after the third process starts and after the third process is completed.

The illustrated method, systems and computer program products do not require snapshot cascading.

For simplicity of explanation the following figures will refer to a first memory area to a first memory sub area to a second memory area and to a second memory sub area. The terms 'first' and 'second' are only used to distinguish one memory area (or memory sub area) from another. It is noted that a memory area can be a volume while a memory sub area can be a track but this is not necessarily so.

Figure 1:
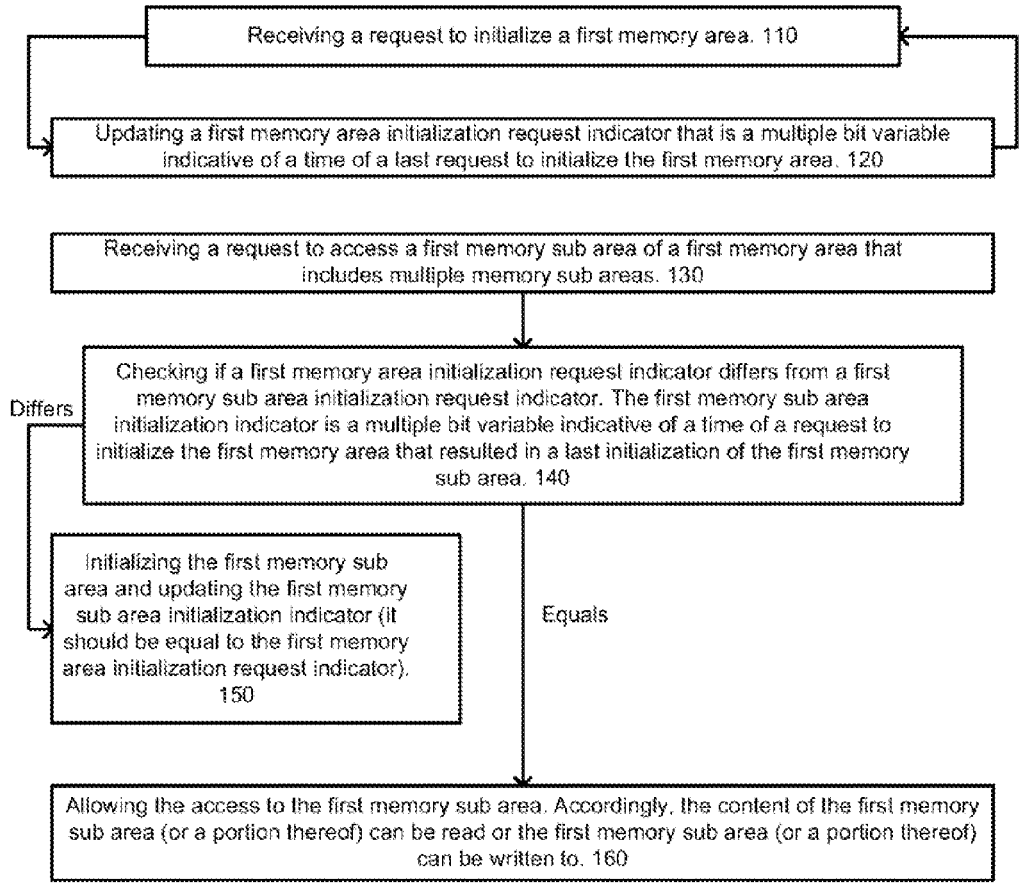
FIG. 1 illustrates a method for initializing a memory area according to an embodiment of the invention.

FIG. 1 illustrates method 100 for initializing a memory area, according to an embodiment of the invention.

For simplicity of explanation this memory area will be referred to as a first memory area.

Method 100 starts by stages 110 and 130. Stage 110 includes receiving a request to initialize a first memory area. Stage 110 is followed by stage 120 of updating a first memory area initialization request indicator that is a multiple bit variable indicative of a time of a last request to initialize the first memory area. Stage 120 is followed by stage 110. The first memory area initialization request indicator can represent the serial number (or 'generation') of the request.

Stage 130 includes receiving a request to access a first memory sub area of a first memory area that includes multiple memory sub areas. It is noted that the first memory sub area can be any memory sub area out of multiple memory sub areas that form the first memory area.

Stage 130 is followed by stage 140 of checking if a first memory area initialization request indicator differs from a first memory sub area initialization request indicator. The first memory sub area initialization indicator is a multiple bit variable indicative of a time of a request to initialize the first memory area that resulted in a last initialization of the first memory sub area.

If the answer is negative then stage 140 is followed by stage 160 of allowing the access to the first memory sub area. Accordingly, the content of the first memory sub area (or a portion thereof) can be read or the first memory sub area (or a portion thereof) can be written to.

If the answer is positive then stage 140 is followed by stage 150 of initializing the first memory sub area and updating the first memory sub area initialization indicator (it should be equal to the first memory area initialization request indicator). Stage 150 is followed by stage 160.

The initialization can include writing initialization information to the memory sub areas. The same initialization information can be written to different memory sub areas but this is not necessarily so. It can be a predefined sequence of '0' and/or '1'. The initialization information can be generated by an initialization function. For example—the initialization information can identify the memory sub area or the memory area.

It is noted that stage 130-160 can be repeated for each memory sub area of the first memory area.

Method 100 requires an execution of stage 140 whenever the first memory sub area is accessed. In order to reduce the number of iterations of stage 140 additional metadata can be used. This additional metadata can indicate whether the whole first memory sub area (or a group of memory sub area that include the first memory sub area) was initialized in response to the last request to initialize the first memory area. Once such an initialization session is completed there is no need to perform the comparison of stage 140.

A first memory sub area group initialization completion indicator is provided. It indicates that an entire group of memory sub areas (of the first memory area) was already initialized in response to the last request to initialize the first memory area. According to various embodiments of the invention the first memory area can include one or more groups. These groups can be of the same size or of different sizes. According to an embodiment of the invention the whole first memory area can be regarded as a single group of memory sub areas.

Figure 2:
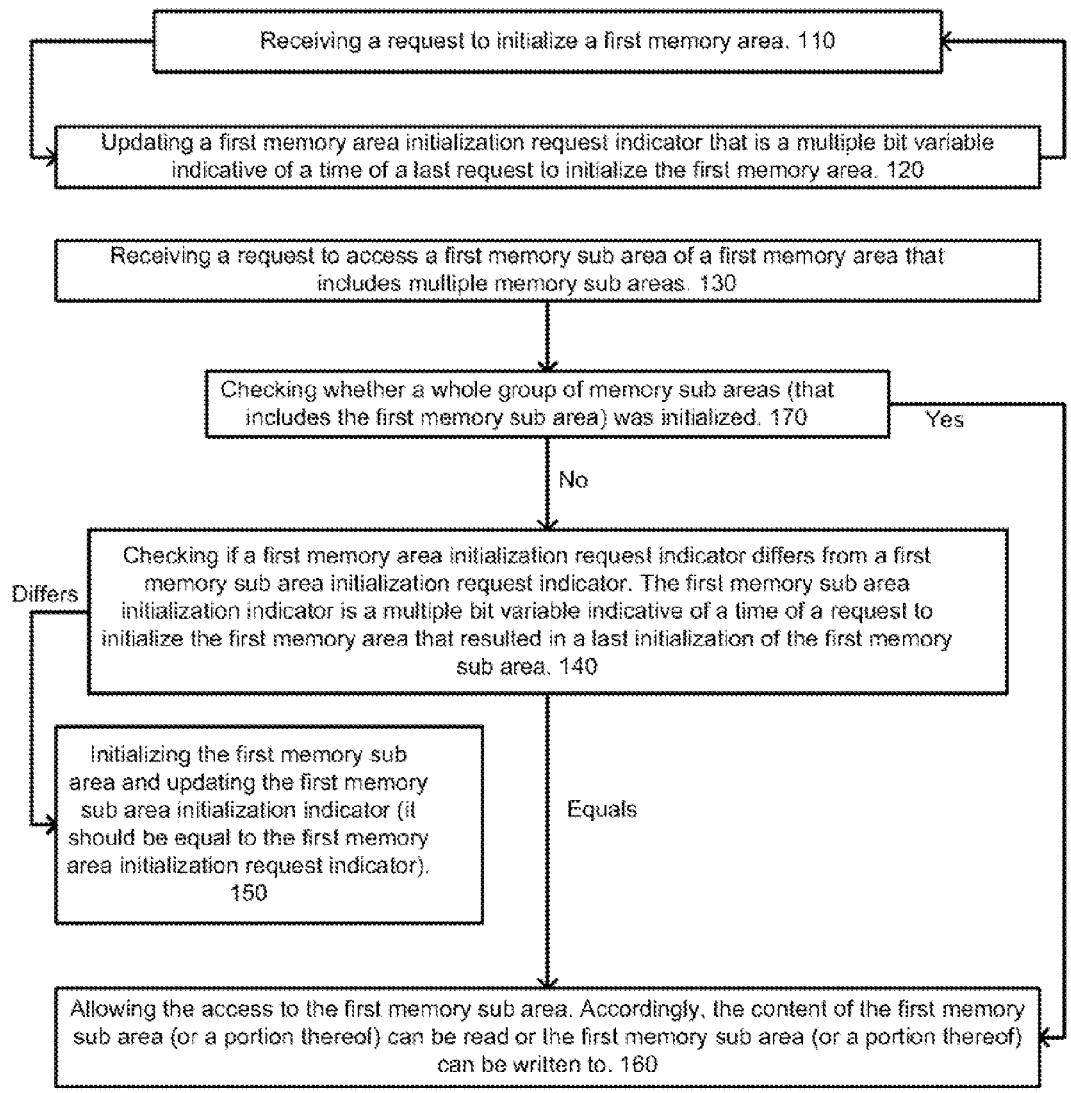
FIG. 2 illustrates a method for initializing a memory area according to an embodiment of the invention.

FIG. 2 illustrates method 102 for initializing a memory area, according to another embodiment of the invention.

Method 102 of FIG. 2 differs from method 100 of FIG. 1 by including stage 170 of checking whether a whole group of memory sub areas (that includes the first memory sub area) was initialized.

Stage 130 is followed by stage 170.

If the whole group of memory sub areas was initialized then stage 170 is followed by stage 160.

Else, stage 170 is followed by stage 140, as there is a need to check whether the first memory area initialization request indicator differs from the first memory sub area initialization request indicator. If the answer is negative then stage 140 is followed by stage 160, else stage 140 is followed by stage 150. Stage 150 is followed by stage 160.

Thus, method 102 includes providing the content of the at least portion of the first memory sub area without comparing the first memory area initialization request indicator to the first memory sub area initialization indicator if the memory sub area group initialization completion indicator indicates that an entire group of memory sub areas that includes the first memory sub area was initialized in response to the last request to initialize the first memory area.

According to various embodiments of the invention the initialization method can be applied when a snapshot copy of the content of the first memory area are generated. A snapshot copy of a content of the first memory area is a copy of that content of the first memory area as it was at a certain point of time. Typically, the process of generating such a copy is time consuming and there is a need to maintain the initialization status of memory sub areas during the copying process and after the copying process is completed. The multiple bit variables introduced previously can assist in maintaining the initialization status.

Figure 3:
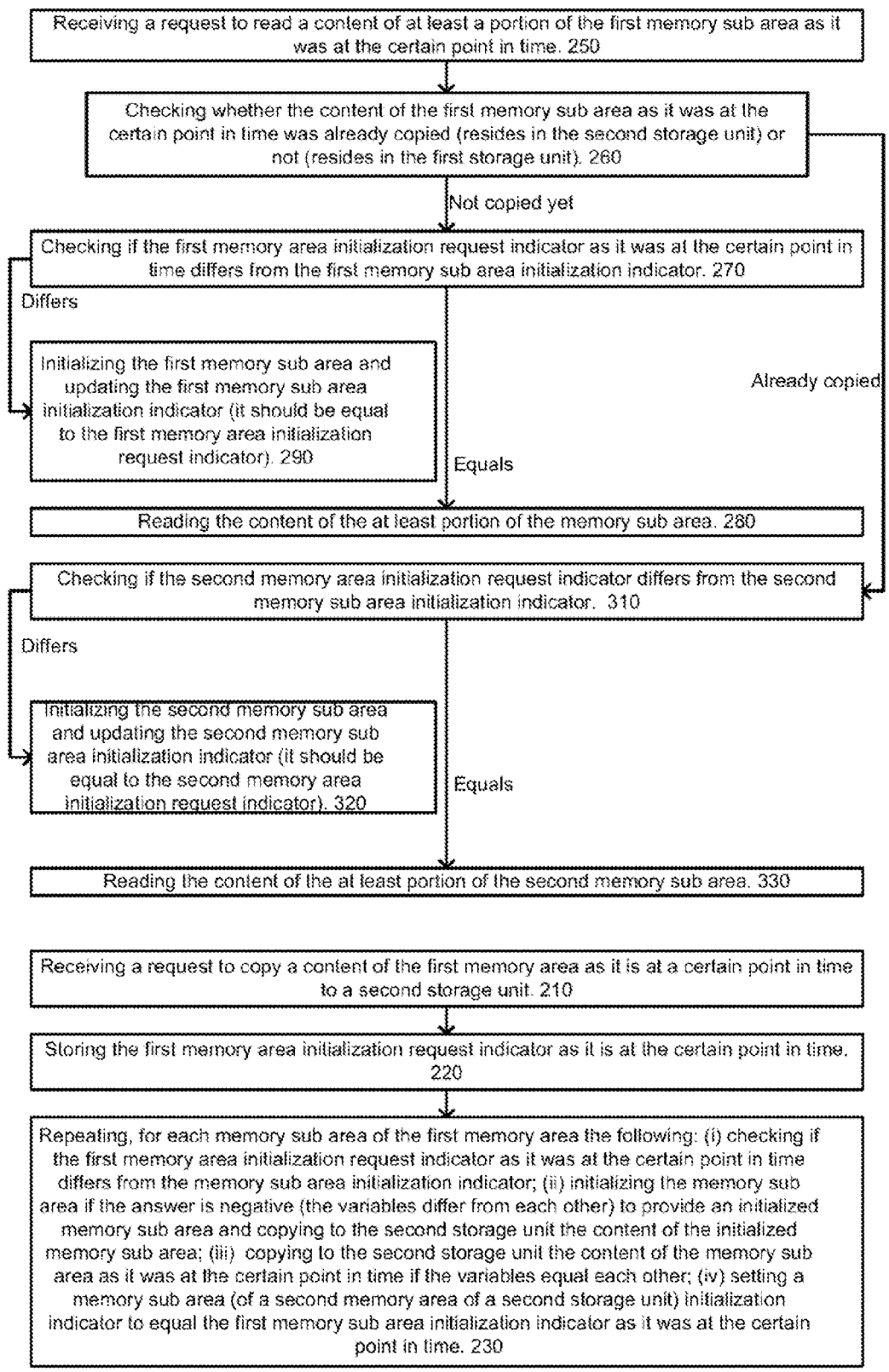
FIG. 3 illustrates a method for initializing a memory area according to an embodiment of the invention.

FIG. 3 illustrates method 104 of initializing a first memory area according to a further embodiment of the invention.

It is assumed that the first memory area is included in a first storage device and that the snapshot copy should be stored at a second memory area of a second storage unit.

Method 104 starts by stage 210 of receiving a request to copy a content of the first memory area as it is at a certain point in time to a second storage unit.

Stage 210 is followed by stage 220 of storing the first memory area initialization request indicator as it is at the certain point in time.

Figure 4:
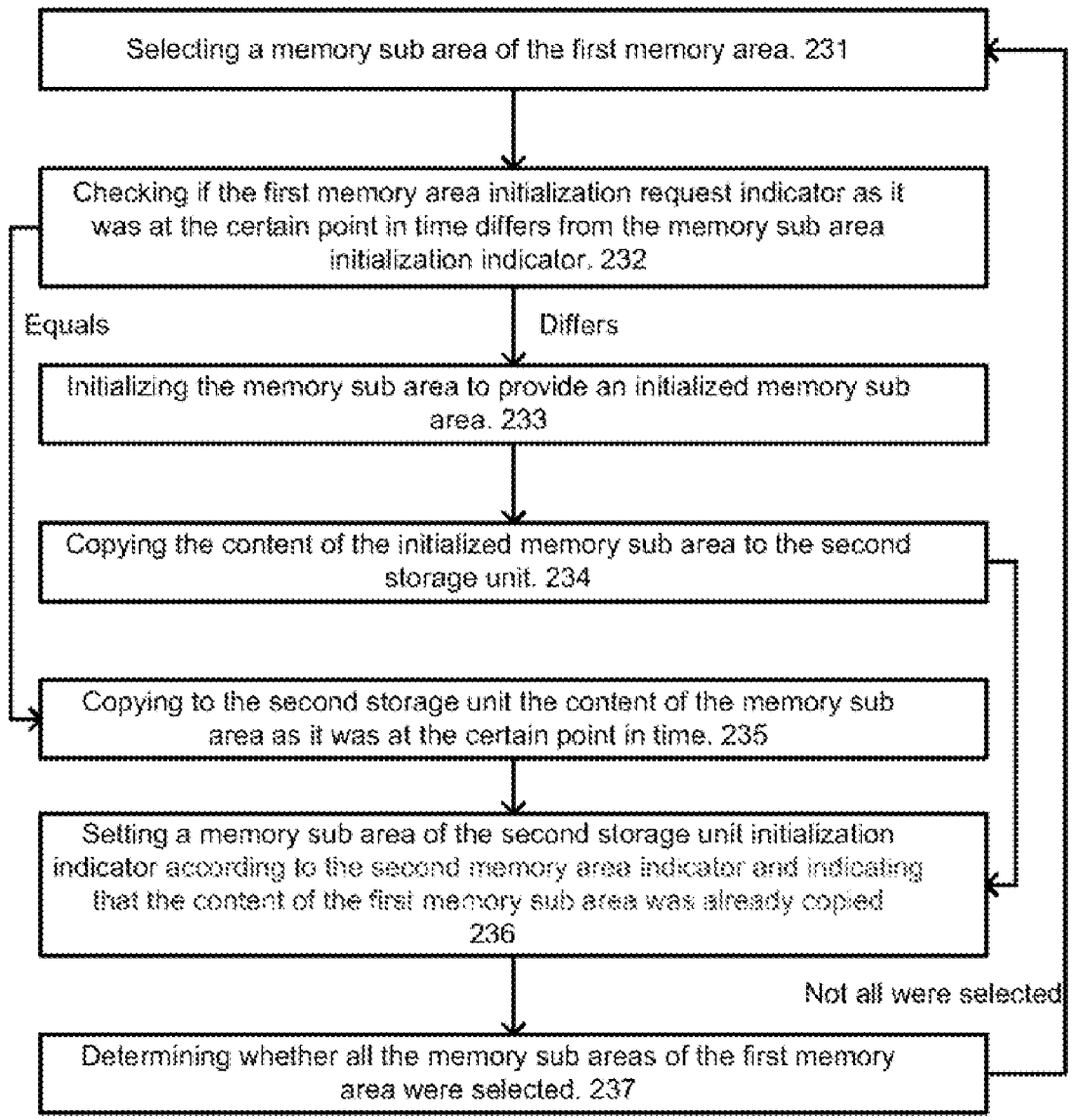
FIG. 4 illustrates a stage of the method for initializing a memory area of FIG. 3 according to an embodiment of the invention

Stage 220 is followed by stage 230. Stage 230 includes the following stages (that are illustrated in FIG. 4): (i) stage 231 of selecting a memory sub area of the first memory area; (ii) stage 232 of checking if the first memory area initialization request indicator as it was at the certain point in time differs from the memory sub area initialization indicator; (iii) stage 233 of initializing the memory sub area if the answer is positive to provide an initialized memory sub area; (iv) stage 234 (that is preceded by stage 233) of copying the content of the initialized memory sub area to the second storage unit; (v) stage 235 of copying to the second storage unit the content of the memory sub area as it was at the certain point in time if the answer is negative; (vi) stage 236 (preceded by stage 235 and 234) of setting a second memory sub area initialization indicator according to the second memory area indicator and indicating that the content of the first memory sub area was already copied; (vii) stage 237 (preceded by stage 236) of determining whether all the memory sub areas of the first memory area were selected. If the answer is negative another memory sub area is selected during stage 231.

Accordingly, stage 230 includes repeating, for each memory sub area of the first memory area the following: (i) checking if the first memory area initialization request indicator as it was at the certain point in time differs from the memory sub area initialization indicator; (ii) initializing the memory sub area if the answer is negative (the variables differ from each other) to provide an initialized memory sub area and copying to the second storage unit the content of the initialized memory sub area; (iii) copying to the second storage unit the content of the memory sub area as it was at the certain point in time if the variables equal each other; (iv) setting a memory sub area (of a second memory area of a second storage unit) initialization indicator to equal the first memory sub area initialization indicator as it was at the certain point in time.

While stage 230 is in progress and even after it is completed a request to read a content of at least a portion of a first memory sub area as it was at the certain point in time can be received. This is illustrated by stage 250 of receiving a request to read a content of at least a portion of the first memory sub area as it was at the certain point in time.

Stage 250 is followed by stage 260 of checking whether the content of the first memory sub area as it was at the certain point in time was already copied (resides in the second storage unit) or not (resides in the first storage unit).

If the answer is positive (first memory sub area of first memory area of the first storage unit was copied to a second memory sub area of a second memory area of a second storage unit) then stage 260 is followed by stage 310, else it is followed by stage 270.

Stage 270 includes checking if the first memory area initialization request indicator as it was at the certain point in time differs from the first memory sub area initialization indicator.

If the answer is negative then stage 270 is followed by stage 280 of reading the content of the at least portion of the memory sub area.

If the answer is positive then stage 270 is followed by stage 290 of initializing the first memory sub area and updating the first memory sub area initialization indicator (it should be equal to the first memory area initialization request indicator). Stage 150 is followed by stage 280.

Additionally or alternatively, a request to write at least a portion of the content of the first memory sub area can be received while stage 230 is in progress or even after it is completed. In this case instead of reading the content of at least a portion of the first memory sub area (initialized or as it was at the certain point in time) a write operation is executed.

Stage 310 includes checking if the second memory area initialization request indicator differs from the second memory sub area initialization indicator. The second memory area initialization request indicator is a multiple bit variable indicative of a time of a last request to initialize the second memory area.

If the answer is negative then stage 310 is followed by stage 330 of reading the content of the at least portion of the second memory sub area.

If the answer is positive then stage 310 is followed by stage 320 of initializing the second memory sub area and updating the second memory sub area initialization indicator (it should be equal to the second memory area initialization request indicator). Stage 320 is followed by stage 330.

Figure 5:
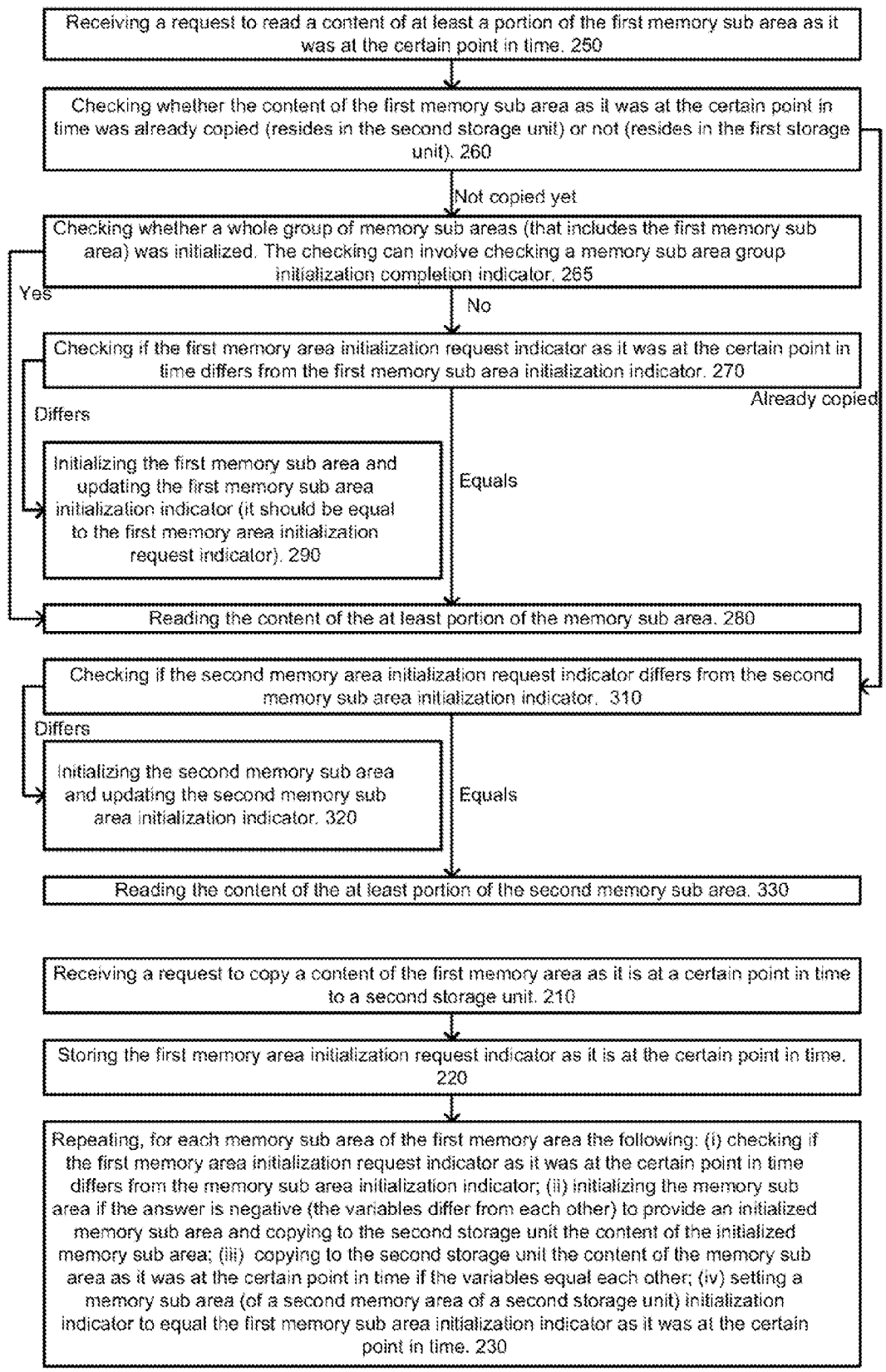
FIG. 5 illustrates a method for initializing a memory area according to an embodiment of the invention.

FIG. 5 illustrates method 106 of initializing a first memory area according to a further embodiment of the invention.

Method 106 of FIG. 5 differs from method 104 of FIG. 3 by including stage 265. Stage 265 follows stage 260. Stage 265 includes checking whether a whole group of memory sub areas (that includes the first memory sub area) was initialized. The checking can involve checking a memory sub area group initialization completion indicator.

If the whole group of memory sub areas was initialized then stage 265 is followed by stage 280. Else, stage 265 is followed by stage 270, as there is a need to check whether the first memory area initialization request indicator differs from a first memory sub area initialization request indicator. If the answer is negative then stage 270 is followed by stage 280, else stage 270 is followed by stage 290. Stage 290 is followed by stage 280.

Figure 6:
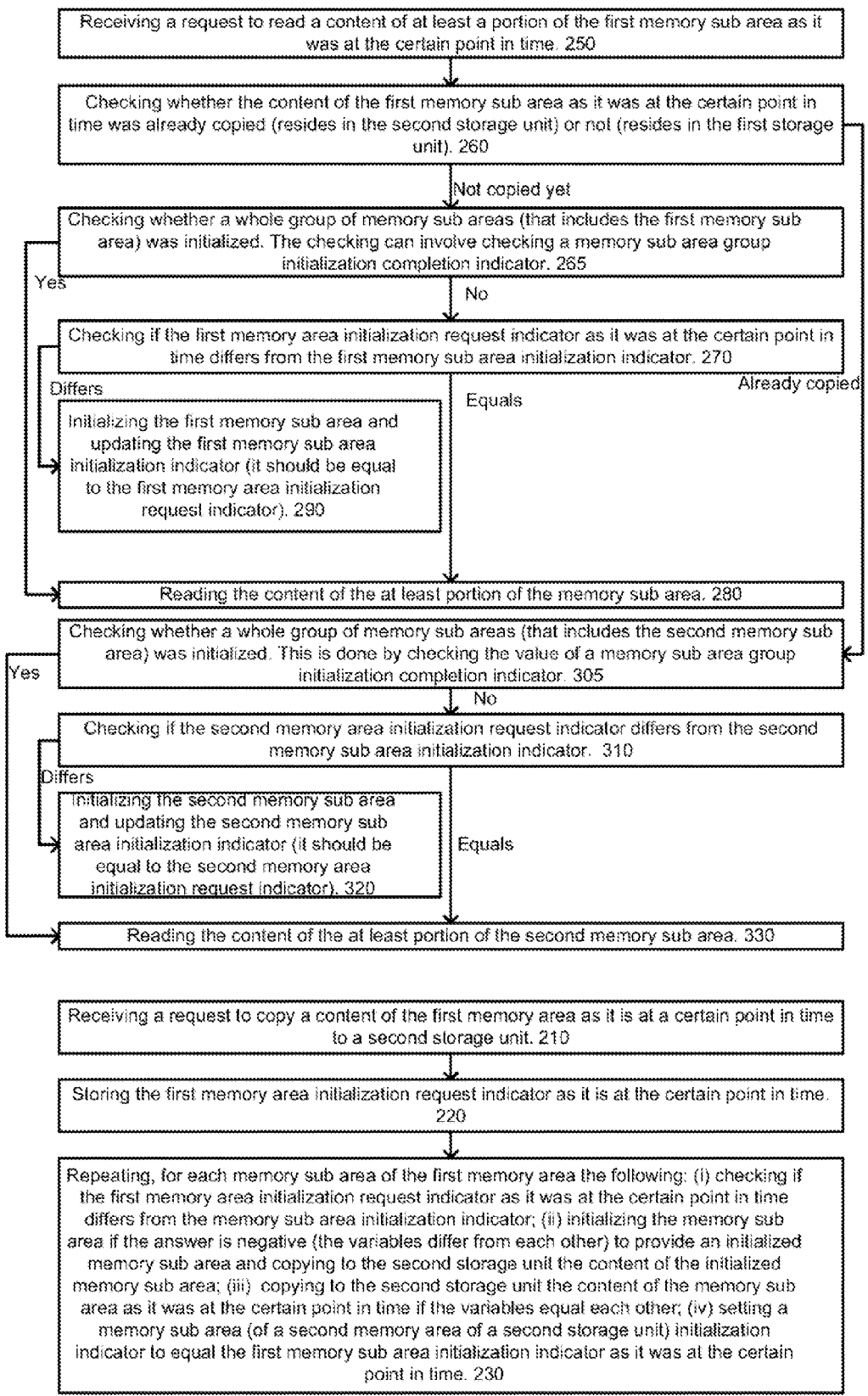
FIG. 6 illustrates a method for initializing a memory area according to an embodiment of the invention.

FIG. 6 illustrates method 108 of initializing a first memory area according to a further embodiment of the invention.

Method 108 of FIG. 6 differs from method 106 of FIG. 5 by including stage 305. Stage 305 follows stage 260. Stage 305 includes checking whether a whole group of memory sub areas (that includes the second memory sub area) was initialized. This is done by checking the value of a memory sub area group initialization completion indicator.

If the whole group of memory sub areas was initialized then stage 305 is followed by stage 330. Else, stage 305 is followed by stage 310, as there is a need to check whether the second memory area initialization request indicator differs from a second memory sub area initialization request indicator. If the answer is negative then stage 310 is followed by stage 330, else stage 310 is followed by stage 320. Stage 320 is followed by stage 330.

Figure 7:
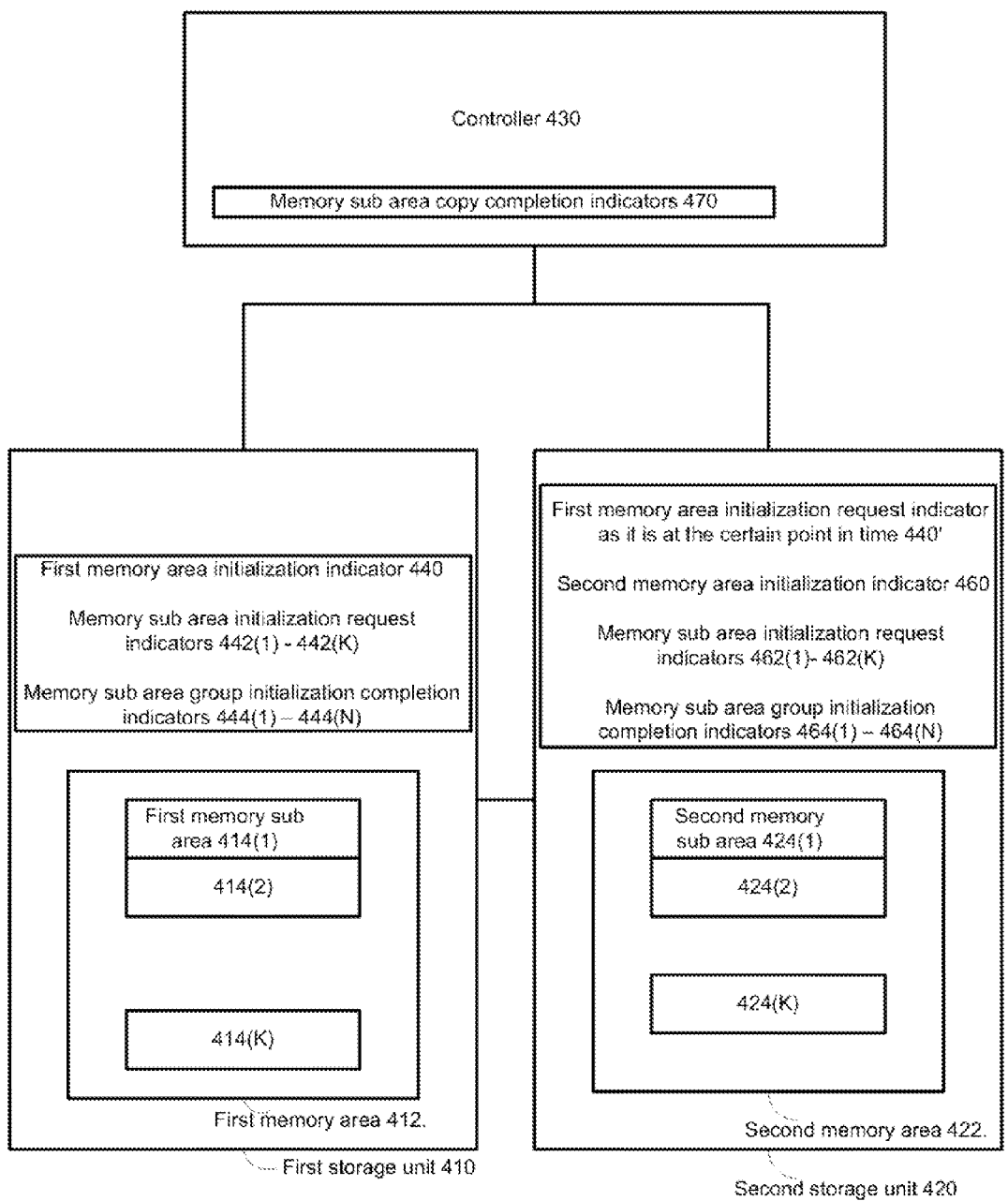
FIG. 7 illustrates a system for initializing a memory area according to an embodiment of the invention.

FIG. 7 illustrates system 400 according to an embodiment of the invention.

System 400 includes first storage unit 410, second storage unit 420 and controller 430. First storage unit 410 can include multiple memory areas such as first memory area 412. First memory area 412 includes multiple memory sub areas such as first memory sub area 414(1) and additional memory sub areas 414(2)-414(K). K being a positive integer that can exceed and even well exceed two. Second storage unit 420 can include multiple memory areas such as second memory area 422. Second memory area 422 includes multiple memory sub areas such as second memory sub area 424(1) and additional memory sub areas 424(2)-424(K). K being a positive integer that can exceed and even well exceed two. There can be N groups of memory sub areas per each memory area out of the first and second memory areas.

Assuming that first storage unit 410 includes a single storage area that in turn includes K memory sub areas that are grouped in N groups and that second storage unit 420 includes a single storage area that in turn includes K memory sub areas that are grouped in N groups then system 400 can store metadata that may includes at least one of the following variables: (i) first memory area initialization indicator 440, (ii) memory sub area initialization request indicators 442(1)-442(K) that are associated with memory sub areas of the first memory area, (iv) first memory area initialization request indicator as it is at the certain point in time 440', (v) memory sub area group initialization completion indicators 444(1)-444(N) that are associated with N groups of memory sub areas of the first memory area, (vi) second memory area initialization indicator 460, (vii) memory sub area initialization request indicators 462(1)-462(K) that are associated with memory sub areas of the second memory area, (viii) memory sub area group initialization completion indicators 464(1)-464(N) that are associated with N groups of memory sub areas of the second memory area; and (ix) memory sub area copy completion indicators 470.

It is noted that if each storage unit includes more than a single memory area then metadata per each memory area is required.

First memory area initialization indicator 440 and a memory sub area initialization request indicator out of indicators 442(1)-442(K) can be compared to each other (for example during stage 140 of method 100 or during stage 270 of method 104) in response to a request to access at least a portion of that memory sub area.

First memory area initialization request indicator as it is at the certain point in time 440' is stored (for example during stage 220 of method 102) in response to a request to create a copy of a content of the first memory area as it was at a certain point in time.

Memory sub area group initialization completion indicators 444(1)-444(N) indicate whether each group of memory sub areas (of the first memory area) was initialized in response to the last request to initialize the first memory area. These indicators can be checked during stage 170 of method 102 or during stage 265 of method 106.

Memory sub area copy completion indicators 470 indicate whether the content of each memory sub area (as it was at a certain point in time) was copied from the first storage unit to the second storage unit. It can be a bit map. These indicators can be checked during stage 260 of method 104.

Second memory area initialization indicator 460 and a memory sub area initialization request indicator out of indicators 462(1)-462(K) can be compared to each other (for example during stage 310 of method 104) in response to a request to access at least a portion of that memory sub area.

Memory sub area group initialization completion indicators 464(1)-464(N) indicate whether each group of memory sub areas (of the second memory area) was initialized in response to the last request to initialize the second memory area. These indicators can be checked during stage 305 of method 106.

It is noted that these variables can be stored in different manners and in different locations. For example, memory sub area initialization request indicators 442(1)-442(K) can be stored in the memory sub areas or in a different location.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for initializing a memory area, the method comprising:
   receiving a request to access a first memory sub area of a first memory area that comprises multiple memory sub areas; and
   initializing the first memory sub area if a first time of a last request to initialize the first memory area or a first indicator indicative thereof differs from a second time of a request to initialize the first memory area that resulted in a last initialization of the first memory sub area or second indicator indicative of the second time.

2. The method according to claim 1 comprising:
   receiving a request to read a content of at least a portion of the first memory sub area; and
   providing the content of the at least portion of the first memory sub area without comparing the times or indicators if a memory sub area group initialization completion indicator indicates that an entire group of memory sub areas that comprises the first memory sub area was initialized in response to the last request to initialize the first memory area.

3. The method according to claim 1 comprising receiving a request to copy a content of the first memory area, as it is at a certain point in time, to a second storage unit and storing the first indicator as it is at the certain point in time; wherein the second storage unit differs from a first storage unit that comprises the first memory area.

4. The method according to claim 3 comprising:
   receiving, before copying the content of the first memory sub area as it was at the certain point of time to a second memory sub area of the second storage unit, a request to read a content of at least a portion of the first memory sub area as it was at the certain point in tune; and
   initializing the first memory sub area to provide an initialized first memory sub area if the first indicator as it was at the certain point in time differs from the second indicator.

5. The method according to claim 3 comprising:
   receiving, before copying the content of the first memory sub area as it was at the certain point of time to a second memory sub area of the second storage unit, a request to read a content of at least a portion of the first memory sub area; and
   providing the content of the at least portion of the first memory sub area without comparing the first time or indicator to the second time or indicator if a memory sub area group initialization completion indicator indicates that an entire group of memory sub areas that comprises the first memory sub area was initialized in response to the last request to initialize the first memory area.

6. The method according to claim 3 comprising:
   copying the content of the first memory sub area as it was at the certain point of time to a second memory sub area of the second storage unit; and
   setting a second memory sub area initialization indicator according to the second memory area indicator and indicating that the content of the first memory sub area was already copied.

7. The method according to claim 6 comprising:
   receiving, after copying the content of the first memory sub area as it was at the certain point of time to the second memory sub area of the second storage unit, a request to read a content of at least a portion of the first memory sub area as it was at the certain point in time; and
   initializing the second memory sub area if a second memory area initialization request indicator differs from the second memory sub area initialization indicator;
   wherein the second memory area initialization request indicator is indicative of a time of a last request to initialize the second memory area.

8. The method according to claim 3 comprising:
   receiving, before copying the content of the first memory sub area as it was at the certain point of time to a second memory sub area of the second storage unit, a request to read a content of at the second memory sub area; and
   initializing the first memory sub area to provide an initialized first memory sub area if the first indicator as it was at the certain point in time differs from the second indicator.

9. The method according to claim 3 comprising:
   receiving, before copying the content of the first memory sub area as it was at the certain point of time to a second memory sub area of the second storage unit, a request to read a content of at least a portion of the first memory sub area as it was at the certain point in time; and
   copying the content of the first memory sub area to a snapshot target and initializing the first memory sub area to provide an initialized first memory sub area if the first indicator as it was at the certain point in time differs from the second indicator.

10. A computer program product comprising a non-transitory computer-readable medium including a computer readable program, wherein the computer readable program when executed on a computer causes the computer to:
receive a request to access a first memory sub area of a first memory area that comprises multiple memory sub areas; and
initialize the first memory sub area if a first time of a last request to initialize the first memory area or a first indicator indicative thereof differs from a second time of a request to initialize the first memory area that resulted in a last initialization of the first memory sub area or second indicator indicative of the second time.

11. The computer program product according to claim 10 that causes the computer to:
receive a request to read a content of at least a portion of the first memory sub area; and
provide the content of the at least portion of the first memory sub area without comparing the tunes or indicators if a memory sub area group initialization completion indicator indicates that an entire group of memory sub areas that comprises the first memory sub area was initialized in response to the last request to initialize the first memory area.

12. The computer program product according to claim 10 wherein the computer program product causes the computer to receive a request to copy a content of the first memory area as it is at a certain point in time to a second storage unit and storing the first indicator as it is at the certain point in time;
wherein the second storage unit differs from a first storage unit that comprises the first memory area.

13. The computer program product according to claim 12 wherein the computer program product causes the computer to:
receive, before copying the content of the first memory sub area as it was at the certain point of time to a second memory sub area of the second storage unit, a request to read a content of at least a portion of the first memory sub area as it was at the certain point in time; and
initialize the first memory sub area to provide an initialized first memory sub area if the first indicator as it was at the certain point in time differs from the second indicator.

14. The computer program product according to claim 12 wherein the computer program product causes the computer to:
receive, before copying the content of the first memory sub area as it was at the certain point of time to a second memory sub area of the second storage unit, a request to read a content of at least a portion of the first memory sub area; and
provide the content of the at least portion of the first memory sub area without comparing the first time or indicator to the second time or indicator if a memory sub area group initialization completion indicator indicates that an entire group of memory sub areas that comprises the first memory sub area was initialized in response to the last request to initialize the first memory area.

15. The computer program product according to claim 12 wherein the computer program product causes the computer to copy the content of the first memory sub area as it was at the certain point of time to a second memory sub area of the second storage unit and set a second memory sub area initialization indicator to equal the first memory sub area initialization indicator as it was at the certain point in time.

16. The computer program product according to claim 15 wherein the computer program product causes the computer to:
receive, after copying the content of the first memory sub area as it was at the certain point of time to the second memory sub area of the second storage unit, a request to read a content of at least a portion of the first memory sub area as it was at the certain point in time; and
initialize the second memory sub area if a second memory area initialization request indicator differs from the second memory sub area initialization indicator;
wherein the second memory area initialization request indicator is indicative of a time of a last request to initialize the second memory area.

17. A system comprising:
a first storage device; and
a memory controller;
wherein the controller is adapted to:
receive a request to access a first memory sub area of a first memory area of a storage unit that comprises multiple memory sub areas; and
initialize the first memory sub area if a first time of a last request to initialize the first memory area or a first indicator indicative thereof differs from a second time of a request to initialize the first memory area that resulted in a last initialization of the first memory sub area or second indicator indicative of the second time.

18. The system according to claim 17 wherein the controller is adapted to:
receive a request to read a content of at least a portion of the first memory sub area; and
control a provision of the content of the at least portion of the first memory sub area without comparing the times or indicators if a memory sub area group initialization completion indicator indicates that an entire group of memory sub areas that comprises the first memory sub area was initialized in response to the last request to initialize the first memory area.

19. The system according to claim 17 wherein the controller is adapted to receive a request to copy a content of the first memory area as it is at a certain point in time to a second storage unit and control a storage of the first indicator as it is at the certain point in time.

20. The system according to claim 17 wherein the controller is adapted to:
receive, before the content of the first memory sub area as it was at the certain point of time is copied to a second memory sub area of the second storage unit, a request to read a content of at least a portion of the first memory sub area; and
control a provision of the content of the at least portion of the first memory sub area without comparing the times or indicators if a memory sub area group initialization completion indicator indicates that an entire group of memory sub areas that comprises the first memory sub area was initialized in response to the last request to initialize the first memory area.

* * * * *